US012657842B2

(12) United States Patent
Guerin et al.

(10) Patent No.: US 12,657,842 B2
(45) Date of Patent: Jun. 16, 2026

(54) AUGMENTED REALITY METHOD FOR MONITORING AN EVENT IN A SPACE COMPRISING AN EVENT FIELD IN REAL TIME

(71) Applicant: IMMERSIV, Paris (FR)

(72) Inventors: Stéphane Guerin, Paris (FR); Emmanuelle Roger, Paris (FR)

(73) Assignee: IMMERSIV, Paris (FR)

( * ) Notice: Subject to any disclaimer, the term of this patent is extended or adjusted under 35 U.S.C. 154(b) by 201 days.

(21) Appl. No.: 18/406,105

(22) Filed: Jan. 6, 2024

(65) Prior Publication Data

US 2024/0144613 A1 May 2, 2024

Related U.S. Application Data

(63) Continuation-in-part of application No. 17/426,097, filed as application No. PCT/EP2020/052137 on Jan. 29, 2020, now abandoned.

(30) Foreign Application Priority Data

Jan. 29, 2019 (FR) .................................. FR1900794

(51) Int. Cl.
    *G06T 19/00*     (2011.01)
    *G06V 10/74*     (2022.01)
    *G06V 20/52*     (2022.01)

(52) U.S. Cl.
    CPC .......... *G06T 19/006* (2013.01); *G06V 10/761* (2022.01); *G06V 20/52* (2022.01); *G06V 2201/07* (2022.01)

(58) Field of Classification Search
    CPC .......................... G06T 19/006; G06V 2201/07
    See application file for complete search history.

(56) References Cited

U.S. PATENT DOCUMENTS

2003/0120391 A1    6/2003    Saito
2007/0088478 A1    4/2007    Mori
(Continued)

OTHER PUBLICATIONS

Seong-Oh Lee et al., "A vision Based Mobile Augmented Reality System for Baseball Games," Int. Conf. Computer Analysis of Images and Patterns, Jul. 9, 2011, pp. 61-68, Springer, Berlin.
(Continued)

*Primary Examiner* — Yi Yang
(74) *Attorney, Agent, or Firm* — H&I PARTNERS; Chai Im; C. Andrew Im

(57) ABSTRACT

An augmented reality method for monitoring an event in space includes acquisition of a plurality of images of space having at least two landmarks by a camera of a portable device. Space being associated with a three-dimensional reference frame and the portable device being associated with a two-dimensional reference frame. A three-dimensional position and orientation of the space in relation to the camera is determined. The instantaneous position, within the reference frame of the space, of a mobile element moving in the space is received. The position of the mobile element in the two-dimensional reference frame is calculated from transformation parameters calculated from the three-dimensional position and orientation of the space in relation to the camera. An overlay at a predetermined distance in relation to the position of the mobile element in the two-dimensional reference frame is displayed on the screen. Also, a portable electronic device implements the method.

15 Claims, 3 Drawing Sheets

(56)                    References Cited

U.S. PATENT DOCUMENTS

2010/0026801  A1     2/2010  Williams et al.
2016/0158640  A1     6/2016  Gupta et al.
2018/0189600  A1     7/2018  Astrom et al.
2019/0082118  A1     3/2019  Wang et al.

OTHER PUBLICATIONS

Manon Kok et al., "Using Inertial Sensors for Position and Orientation Estimation," arxiv.org, Cornell University Library, Apr. 20, 2017.
Iaroslav Melekhov et al., "Relative Camera Pose Estimation Using Convolutional Neural Networks," Int. Conf. Computer Analysis of Images and Patterns, Nov. 23, 2017, pp. 675-687, Springer, Berlin.
Eric Brachmann et al., "Learning 6D Object Pose Estimation Using 3D Object Coordinates," Int. Conf. Computer Analysis of Images and Patterns, Jan. 1, 2014, pp. 536-551, Spring, Berlin.

AUGMENTED REALITY METHOD FOR MONITORING AN EVENT IN A SPACE COMPRISING AN EVENT FIELD IN REAL TIME

RELATED APPLICATIONS

This application is a continuation-in-part of U.S. application Ser. No. 17/426,097 filed Jul. 27, 2021, which is a § 371 application of PCT/EP2020/052137 filed Jan. 29, 2020, which claims priority from French application FR1900794 filed of Jan. 29, 2019, each of which is incorporated herein by reference in its entirety.

TECHNICAL FIELD

The field of the invention is that of digital data processing.

More precisely, the invention relates to an augmented reality method for monitoring an event in a space comprising an event field in real time.

The invention has in particular applications for live monitoring of a sports event, such as a soccer, rugby, basketball, tennis, etc. game, in a grandstand of a sports facility such as a stadium or a hall. The invention also has applications in the field of entertainment, for example for monitoring a game, a live performance or a concert.

BACKGROUND OF THE INVENTION

Techniques are known from the prior art that make it possible to monitor an event by displaying in particular in real time data, such as statistics linked to an individual or to a group of individuals participating in the event, such as for example the number of goals scored by a player during a soccer game, the number of aces or direct faults of a player during a tennis match, the rate of success of the 3-point shots of a player during a basketball game, etc.

Such data is generally displayed on a screen of the facility wherein the event is unfolding.

The major disadvantage of these techniques is that they are hardly intuitive for an individual monitoring the event from a grandstand of the facility. Furthermore, these techniques tend to divert the attention of the individual who has to turn their head to look at a screen of the facility.

None of the current systems makes it possible to simultaneously respond to all the needs required, namely, to propose a technique that allows an individual to monitor an event by intuitively displaying data associated with actors of the event without diverting the attention of the individual.

SUMMARY OF THE INVENTION

The present invention aims to overcome all or a part of the disadvantages of the prior art mentioned hereinabove.

For this purpose, the invention relates to an augmented reality method for a monitoring an event in a space comprising an event field in real time processed by a portable device comprising a screen and a camera, comprising steps of:

acquiring, by the camera, a plurality of images of a space, the space comprising at least two landmarks, the portable device being associated with a two-dimensional reference frame, referred to as the reference frame of the image;

detecting the at least two landmarks of the space in at least one of the acquired images, the space being associated with a three-dimensional reference frame, referred to as the reference frame of the space;

determining a three-dimensional position and orientation of the space in relation to the camera with reference to the at least two landmarks;

receiving an instantaneous position, within the reference frame of the space, of a mobile element moving in the space, the instantaneous position being determined outside the portable device;

calculating a position of the mobile element in the reference frame of the image from transformation parameters between the reference frame of the space and the reference frame of the image, the transformation parameters being calculated from a three-dimensional position and an orientation of the space in relation to the camera; and displaying on the screen at least one overlay at a predetermined distance in relation to the position of the mobile element in the reference frame of the image.

Thus, by knowing the transformation between the reference frame of the space and the reference frame of the image, it is possible to display data associated with said mobile element participating in a live event such as a sports game, a show or a concert, in the overlay that is displayed in the vicinity of the image of the mobile element on the screen retransmitting the image acquired by the image acquisition device.

The space can comprise, for example, a field of a match or a stage of a show hall. The space is generally delimited so as to allow spectators to monitor the live event unfolding in space, for example, from at least one grandstand in the vicinity of the field or stage.

The mobile element is generally an actor participating in a live event, such as a player participating in a sports game unfolding on the field, an actor in a show or a musician in a concert. The mobile element can also be an accessory such as a game accessory played with by players during a match. A game accessory is generally a ball, a puck or a shuttlecock.

It should be underlined that the overlay makes it possible to display a piece of information, a static or animated image, a video, or any other element that makes it possible to embellish the event displayed on the screen.

The transformation parameters between the reference frame of the space which is three-dimensional and the reference frame of the image which is two-dimensional are generally calculated from the three-dimensional position of the space in relation to the image acquisition device and from the three-dimensional orientation of the space in relation to the image acquisition device which can be a camera.

It should be underlined that the image acquisition device can be represented in the reference frame of the space. This representation generally comprises the three-dimensional coordinates of the image acquisition device in the reference frame of the space and the three angles that make it possible to orient the image acquisition device in the reference frame of the space.

The transformation between the reference frame of the space and the reference frame of the image generally comprises at least one translation, at least one rotation and a projection.

It should be underlined that the determining of the three-dimensional position and orientation of the space in relation to the image acquisition device, in a reference frame associated with the image acquisition device or directly in the reference frame of the space, is carried out by detecting landmarks in an image covering at least partially the space, not by using a depth-of-field camera. Indeed, in light of the generally very substantial distance between the image acquisition device and the space, a depth-of-field camera would not be adapted as it would induce excessive imprecision in the position and the orientation of the space.

In particular embodiments of the invention, the augmented reality method comprises before the monitoring of the event:

acquiring a plurality of partial images of event fields with an image acquisition device and recording the images of the event fields along with a three-dimensional position and an orientation of the image acquisition device; and using a deep learning method on the partial images of the event fields previously recorded, for recognizing a type of field, landmarks associated with this type of field, a reference frame of the space and a reference frame of the image acquisition device.

It should be emphasized that the three-dimensional position and the orientation of the image acquisition device acquiring a partial image could be acquired simultaneously or calculated a posteriori by known techniques. An annotation of the landmarks on each image could be performed manually or automatically, in order to calculate the three-dimensional position and the orientation of the corresponding image acquisition device.

Advantageously, a landmark is chosen from:

a line of a marking of a field or of a stage comprised in the space;

a semi-circle of a marking of a field or of a stage comprised in the space;

an intersection between two lines of a marking of a field or of a stage comprised in the space;

an element standing substantially perpendicularly in relation to the surface of a field or of a stage comprised in the space;

an element characteristic of a structure surrounding the surface of a field or of a stage comprised in the space;

a logo comprised in the space; and a marker comprised in the space.

Preferably, four landmarks are detected and used to determine the three-dimensional position and orientation of the space in relation to the image acquisition device.

In particular embodiments of the invention, the augmented reality method also comprises a step of automatic recognition of the type of field comprised in the space.

This step of automatically recognizing the type of field is generally based on detecting characteristic points linked to the shape of the sports field recognized which can be of any type: soccer, basketball, handball, rugby, tennis, hockey, baseball, etc. These characteristic points can be confused with the landmarks detected. It should be underlined that this step of recognizing is not specific to one sport in particular but makes it possible to recognize any sports field of which the characteristic points are known. The characteristic points are generally the general shape of the field, the relative position of the lines in relation to the field, the presence, and the relative position of a semi-circle in relation to the field, etc.

Advantageously, the automatic recognition of the type of a field is carried out via a method of deep learning trained on a plurality of field images.

Thus, it is possible to quickly recognize any type of field, regardless of its orientation, its viewing angle.

Furthermore, thanks to this method of deep learning, it is possible to recognize a field from a partial image of the field, i.e. without needing to see the entire field.

In particular embodiments of the invention, the augmented reality method further comprises steps of:

acquiring an instantaneous movement of the portable device, in rotation and in translation in relation to the space; and updating the position and the orientation of the space in relation to the portable device from a preceding position and orientation of the space in relation to the portable device and of the instantaneous movement of the portable device.

Thus, the data overlays in the images displayed on the screen are more stable. Furthermore, these additional steps make it possible to obtain an augmented reality method that uses less calculation time and therefore less electrical energy. Indeed, once the three-dimensional position and orientation of the space in relation to the image acquisition device are known, it is easy to update them by knowing the movements of the image acquisition device. A method that can be used to evaluate these movements is, for example, the SLAM (Simultaneous Localization And Mapping) type.

In particular embodiments of the invention, the step of determining the three-dimensional position and orientation of the space in relation to the portable device comprises a sub-step of generating parameters of a computer machine learning algorithm from a plurality of images recorded in a database, each image of the database representing all or a portion of a space of which the position and the orientation in relation to an image acquisition device having acquired said image are known.

Thus, determining the three-dimensional position and orientation of the field in relation to the image acquisition device can be carried out quickly and precisely by using the parameters generated at the acquired images so as to determine the three-dimensional position and orientation of the space.

In particular embodiments of the invention, the step of determining a three-dimensional position and orientation of the space in relation to the portable device comprises a sub-step of superimposing a model of the space on at least one of the images acquired by the camera.

Thus, the reference frame of the space can be positioned and oriented in the virtual space in relation to the image acquisition device.

In particular embodiments of the invention, the augmented reality method further comprises a step of correcting the instantaneous position of the mobile element according to an instantaneous speed of the mobile element and of an instantaneous acceleration of the mobile element.

Thus, it is possible to improve the position of the overlay in the images, in particular when a substantial latency between the acquisition of the image and the display of the latter. Indeed, using the instantaneous speed of the mobile element and/or the instantaneous acceleration of the latter makes it possible to predict a position of the mobile element in a close interval of time.

In particular embodiments of the invention, displaying the overlay on the image displayed on the screen is carried out in real time.

It should be underlined that the data or piece of data overlaid in the image is generally transmitted by a data provider.

Advantageously, the overlay comprises at least one piece of data chosen from:

a name of a player;

a statistic associated with the player, such as a number of goals, a number of tries, a number of baskets, a number of points scored, a number of successful passes;

a name of a team;

a positioning of a group of players in relation to other players;

a formation of the team or of a group of players;

a distance between a point of the field and a player;

a difference between two points of the field;

a graphic element such as a line, a circle, an ellipse, a curve, a square or a triangle;

a heat map;

a fixed or animated image;

a video.

An animation can for example be linked to the celebration of scoring points during a game.

A heat map can show for example all the positions of a player doing a kick shot or the mean positions of a player in the space.

In particular embodiments of the invention, the augmented reality method further comprises a step of determining a clipping of a mobile element, the clipping generating an occlusion for at least one overlay superimposed on the image displayed on the screen.

Thus, it is possible to have a rendering that is much more realistic by masking a portion of the overlay displayed at a mobile element, and in particular at a player. This is in particular the case when the overlay comprises a graphic element such as a virtual line on the field, corresponding for example to an off-side line in soccer or in rugby.

In particular embodiments of the invention, the augmented reality method further comprises a step of selecting a mobile element and displaying a piece of information relating to the mobile element in an overlay in a vicinity of the mobile element.

The invention also relates to a portable electronic device comprising a camera, a screen and a processor configured to process the augmented reality method according to any of the preceding embodiments.

The portable electronic device also generally comprises a processor and a computer memory storing the instructions of a computer program implementing the augmented reality method.

More particularly, the invention also relates to a portable electronic device comprising a camera, a screen, and a processor configured to:

acquiring, by the camera, a plurality of images of a space, the space comprising at least two landmarks, the portable electronic device being associated with a two-dimensional reference frame, referred to as the reference frame of the image;

detecting the at least two landmarks of the space in at least one image of the plurality of images of the space, the space being associated with a three-dimensional reference frame, referred to as the reference frame of the space;

determining a three-dimensional position and orientation of the space in relation to the camera and the at least two landmarks;

receiving an instantaneous position, within the reference frame of the space, of a mobile element moving in the space, the instantaneous position being determined outside the portable electronic device;

calculating the position of the mobile element in the reference frame of the image from transformation parameters between the reference frame of the space and the reference frame of the image, said transformation parameters being calculated from the three-dimensional position and orientation of the space in relation to the portable electronic device; and displaying on the screen at least one overlay at a predetermined distance in relation to the position of the mobile element in the reference frame of the image.

Preferably, the portable electronic device is selected among a smartphone, augmented reality glasses and an augmented reality headset.

The portable electronic device can comprise a frame and a screen mounted on the frame that is intended for being worn on the face of an individual.

In other terms, the portable electronic device can comprise any means of reproducing an image that can be displayed in front of an eye of an individual, including a contact lens making it possible to reproduce an image.

A display device like a projector or waveguide display can also be included in the portable electronic device in order to display at least one overlay in front of a user's eye. It should be underlined that the screen can be transparent so that the user wearing the frame can see the event through the screen with overlays. In this case, the acquired image is generally not displayed on the screen.

In particular embodiments of the invention, the portable electronic device further comprises at least one among an accelerometer and a gyroscope.

Thus, the device comprises means for evaluating the movements of translation and of rotation of the camera in relation to the space.

It should be underlined that a part of the method could be implemented by a remote server, in particular the steps of:

detecting at least two landmarks of the field in at least one image, the space being associated with a three-dimensional reference frame, referred to as the reference frame of the space; and of determining a three-dimensional position and orientation of the space in relation to the portable device thanks to the landmarks detected.

In which case, the step of updating the three-dimensional position and orientation of the space according to the evaluation of the movements of the camera in relation to the space is implemented by the portable electronic device.

BRIEF DESCRIPTION OF THE DRAWINGS

Other advantages, purposes and particular characteristics of the present invention shall appear in the following non-limiting description of at least one particular embodiment of the devices and methods object of the present invention, in reference to the accompanying drawings, wherein.

DETAILED DESCRIPTION OF EMBODIMENTS

The present description is given in a non-limiting way, with each characteristic of an embodiment able to be combined advantageously with any other characteristic of any other embodiment.

Note that the figures are not to scale.

Example of a particular embodiment of the invention.

Figure 3:
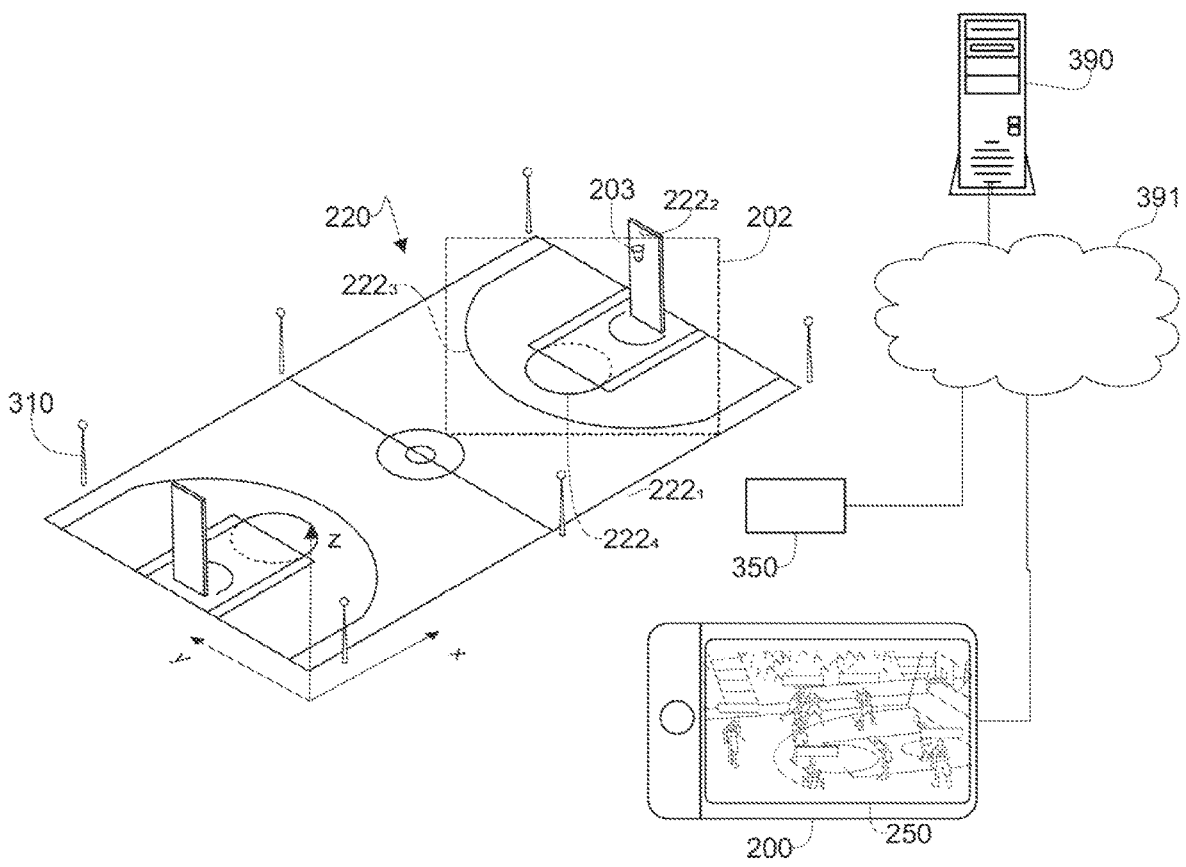
FIG. 3 is a principle view of a system implementing the method of the invention.

FIG. 3 shows an exemplary embodiment of the system of the invention in the case of a basketball game, The game unfolds on a basketball court, such a court comprises landmarks such as lines 222 painted on the floor of the play field.

As an exemplary embodiment, the venue may be equipped by means for tracking in real time the positions of the players and in some instances of the ball. To this end, in a non-limiting example, the players may be carrying one or more RFID chips sewn in their jerseys, as well as on the ball.

A plurality of antennas 310 are distributed around the venue and cover a space 220, enabling to track those RFID chips in the space, e.g. by triangulation, in a coordinate system x and y attached to the space. The tracking system may also enable the tracking of moving objects, like players, referees, a ball or a hockey puck according to 3-dimensional coordinates x, y, z.

Space 220 may be the same as the game court but depending on the type of game, may also be smaller or larger than the game court, in one or more directions.

The tracking frequency is adapted to the type of game/event and is usually higher than 10 Hz, i.e., the position of each object in space 220 is refreshed at least 10 times per second, which, for a spectator appears in real time.

More information may come with the coordinates of moving objects such as, at least, the type of object (player, referee, ball, puck . . . ) but also the number of the player, the team, or the name of the player.

The information is collected by a venue computing system 350 and may be used in the venue itself such as on a giant display.

At least part of the information may be transmitted via a network 391 to a server 390 and said server may transmit this information through a network, to a mobile device 200 of a user watching the game and having subscribed to an augmented reality service.

The information transmitted to the mobile device may be supplemented with additional information, computed on the server, such as, without limitation, statistics of the players, their speed or calculated expected trajectories of the ball.

The user points his mobile device 200 camera to space 220 but may actually see on the screen only part of the space 220 comprised in a frame 202. Therefore, in order to accurately display the information on the screen of the mobile device 200 the coordinates acquired by the venue computing system 350 and transmitted to the server 390 have to be mapped to the coordinate system of the screen of the mobile device seeing the frame 202, further considering that the mobile device may move as well as the frame 202 seen by it.

Figure 1:
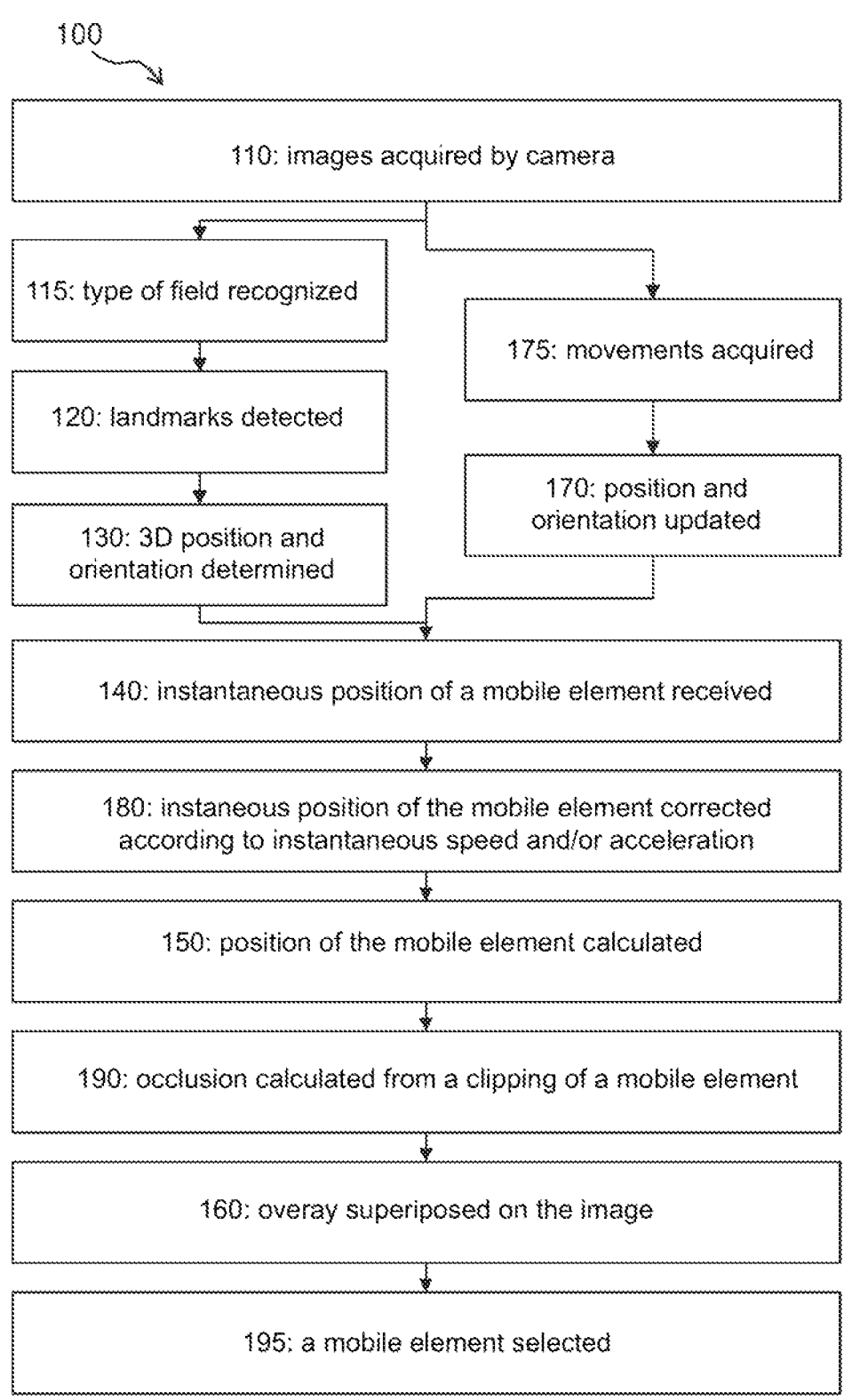
FIG. 1 is a block diagram of an augmented reality method according to the invention.
Figure 2:
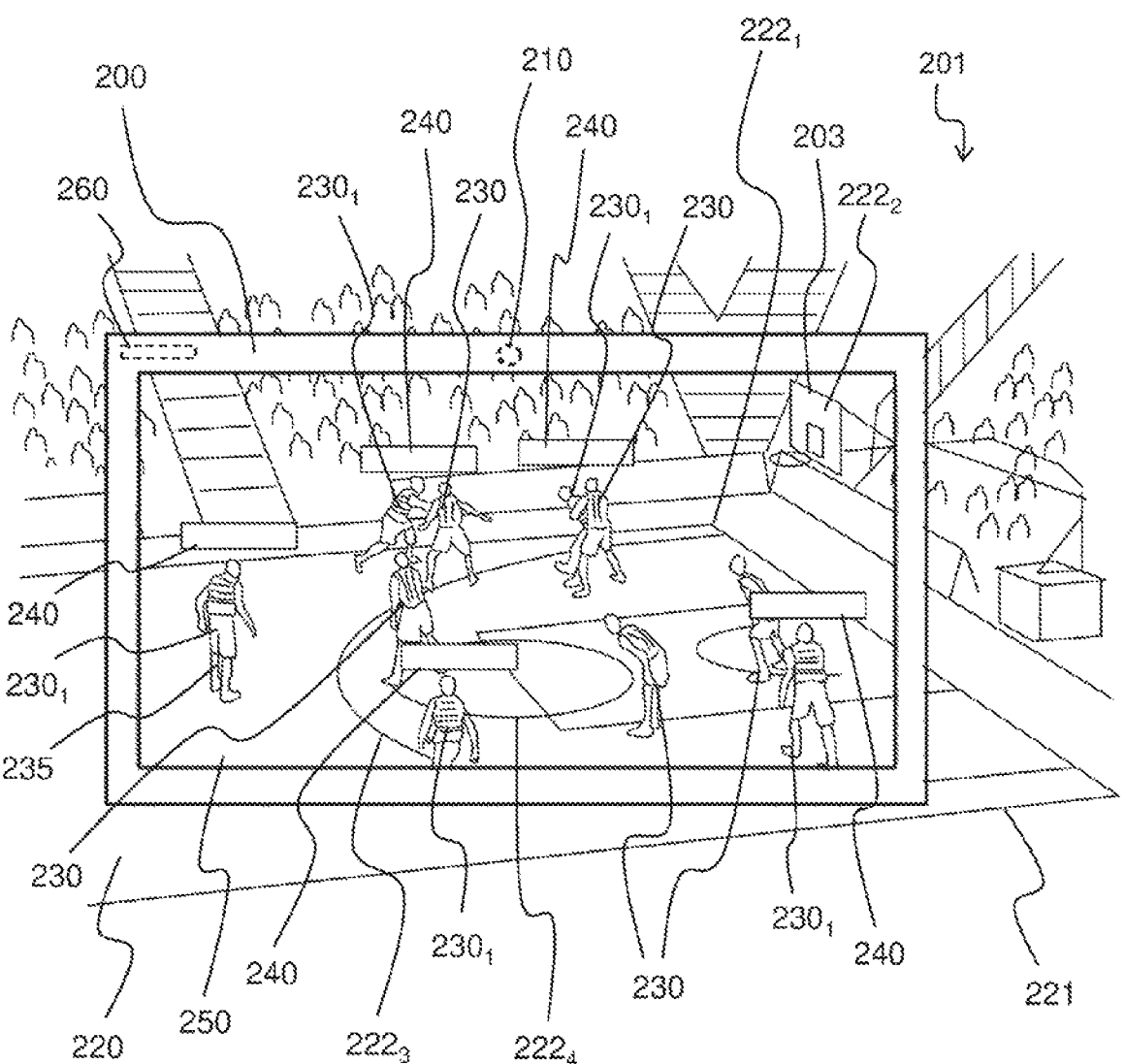
FIG. 2 is a view of a portable electronic device implementing the augmented reality method of FIG. 1.

FIG. 1 shows a block diagram of an augmented reality method 100 according to the invention implemented by a portable electronic device 200 shown in FIG. 2 and FIG. 3.

The portable electronic device 200 is here a smartphone held by an individual (not shown) located in a grandstand 201 which is a hall where a basketball game is unfolding between two teams each comprising five players 230. The two teams play with a game accessory which is a basketball (not shown). The game unfolds on a basketball court 220, comprising a marking 221. The hall 201 comprises a space 220 comprising the court and structures such as the grandstand and two basketball hoops 203.

The individual uses in the present example the portable telephone 200 and sees on a screen 250 of the portable telephone 200 the image acquired in real time acquired by an image acquisition device 210 which is a camera. The camera 210 here captures a portion of the space 220, comprising in particular a portion of the basketball court. In the situation shown in FIG. 2, the players 230 of the two teams are located in one half of the field, one of the two teams, represented by the horizontal stripes is the offense while the other team, represented by the vertical stripes is the defense, i.e. preventing the players 2301 of the offense team from sending the basketball into the basketball hoop 203.

The method 100 thus comprises a first step 110 of acquiring a plurality of images by the camera. It should be underlined that the images acquired generally form a video stream.

In the field of camera 210, four landmarks 222 are detected during the second step 120 of the method. The four landmarks 222 are corner $222_1$ of the field, the basketball hoop 203, a semi-circle $222_3$ representing the three-point line and a semi-circle $222_4$ surrounding a free throw line. It should be underlined that corner $222_1$, the semi-circle $222_3$ and the semi-circle $222_4$ are part of the marking 221 of the basketball court.

Optionally, the method 100 can comprise a step 115 prior to or simultaneously with step 120 of detecting landmarks 222, during which the type of field is recognized via a field recognition algorithm based on deep learning trained on a plurality of sports field images. The algorithm in particular makes it possible to recognize if it is a basketball court, a soccer field, a rugby field, a hockey field, a tennis court or any other field that comprises a plurality of landmarks. It should be underlined that the landmarks detected during step 120 are generally according to the type of field detected.

Thanks to the landmarks 222 detected in the frame 202, a three-dimensional position and orientation of the space 220 relative to the frame 202 are determined during a third step 130 of the augmented reality method. It could be emphasized that frame 202 corresponds to the frame of the image acquired by the camera 210. The relative position between frame 202 and camera 210 is thus known.

Determining the three-dimensional position and orientation can be carried out either by superimposing on the image a model of space 220 thanks to the landmarks 222, or by using parameters of a computer machine learning algorithm.

The model of the space 220 generally comprises a model of the field and of the marking 221, even a model of singular elements that can act as landmarks such as for example the basketball hoops 203. To superimpose the landmarks 222 detected in the image and the landmarks present in the model, a homographic method or a method of the "Perspective-n-Point" type can be used.

When a machine learning algorithm is used, the method generally comprises an additional step of generating parameters of the algorithm from images of the space 220 recorded beforehand in a database, with each image being recorded with the three-dimensional position and orientation of an image acquisition device having acquired said image. This learning step, which requires substantial calculation time, is generally carried out by a remote server. It should be underlined that this learning step is generally carried out only once.

Moreover, the position of space 220 in relation to camera 210 is generally calculated in a reference frame that is associated either with the camera 210 or with the space 220. Passing from the reference frame of the camera to the reference frame of the space is generally carried out easily by a translation and a rotation, these two reference frames being three-dimensional.

Transformation parameters between the reference frame of the space and a two-dimensional reference frame associated with the camera 210, referred to as the reference frame of the image, are calculated to transform the coordinates obtained in the reference frame of the space into the reference frame of the images obtained by the camera 210. It should be underlined that the reference frame of the image is separate from the reference frame of the camera in that the reference frame of the image is a two-dimensional reference frame and the reference frame of the camera a three-dimensional reference frame. Generally, a projection makes it possible to pass from the reference frame of the camera to the reference frame of the image.

The instantaneous position of a mobile element 235 in the reference frame of the space is then received during the fourth step 140 of the augmented reality method 100. The mobile element 235 is here one of the five players 230 of one of the two teams confronting each other during a basketball game. The mobile element can also be the game accessory played with by the two teams, namely the basketball (not shown in FIG. 2).

It should be emphasized that the instantaneous position is not calculated by the portable electronic device 200 which merely receives the position of the mobile element 235 acquired in real time by existing methods. An example of such methods is a method of geolocating an emitter worn by a player by triangulation. This type of method is generally used for sports with contacts between players like basketball, American football or rugby.

The positions of the mobile elements in space 202 are generally provided more than 10 times per second by a data provider, for example between 25 and 60 times per second.

Several positions of a mobile element can also be received in order to display a trajectory of the mobile element. Alternatively, the instantaneous positions can also be recorded in a memory of the portable electronic device 200.

A calculation of the position of the mobile element 235 in the reference frame of the image is carried out during the fifth step 150 of the augmented reality method 100.

When the position of the mobile element 235 is known in the reference frame of the image, it is possible to superimpose on the image displayed on the screen 250 an overlay 240 in the vicinity of the position of the mobile element during a sixth step 160 of the method 100. Generally, the position of the overlay 240 is carried out at a predetermined distance from the instantaneous position of the mobile element 235 in the image. In the present non-limiting example of the invention, the overlay 240 is superimposed vertically in relation to the position of the mobile element 235 in such a way that it appears above the mobile element 235 on the image displayed.

It should be underlined that it is possible, as in FIG. 2, to repeat steps 140 to 160 in order to display overlays 240 for a plurality of mobile elements present in frame 202, here for the five players 2301 of the team which is on offense.

The overlay 240 for each player 2301 can comprise one or more pieces of data, such as the name of the player and the number of points scored since the beginning of the game. Any other statistical data useful for monitoring the game can be displayed with this method 100. The overlay 240 can also comprise an animation that is displayed as soon as the mobile element 235 has scored a point, by sending the ball into the basketball hoop of the opposing team.

Thus, the individual located in a grandstand can see the basketball game while still consulting the data of the players 2301 on the screen of their telephone 200. It should be underlined that the image displayed on the screen 250 of their telephone 200 can advantageously be superimposed on the field seen by the individual, in such a way that the individual can monitor the game without loss of attention. Furthermore, the individual is not obligated to turn their head to look at a screen (not shown in FIG. 2) present in hall 201.

Furthermore, as the data is displayed directly in the vicinity of the players 230, the monitoring is more intuitive.

By using screen 250, generally touch sensitive, the individual can also select the type of data that they wish to view, such as a particular statistic of a player.

It should be underlined that the data overlay during the method 100 is advantageously carried out in real time in relation to the image acquired. In other terms, the calculation time between the acquisition of the image and the displaying of the latter with the overlay or overlays 240 is carried out in a very short lapse of time, generally less than a millisecond, in such a way that the individual can see the images acquired of the event practically simultaneously with a direct view of the event.

To this effect, steps 120 and 130, greedy in terms of computing time, can be advantageously carried out on a remote server (not shown in FIG. 2). At least one acquired image is thus transmitted to the remote server 390 via means of telecommunication included in the telephone 200.

So as to reduce latency, the transmission of the data between the telephone 200 and the remote server 390 can be carried out by using a telecommunication network configured according to the 5G standard. Furthermore, latency can also be reduced by using a computer server close to an antenna of the telecommunication network, the computer server then playing the role of the remote server performing the calculations of steps 120 and 130. In this case, this type of architecture is known as edge computing.

From the three-dimensional position and orientation of the space 220 in relation to the camera 210 calculated by the remote server 390 for a given image, the method 100 updates this position and this orientation according to the movements of the camera 210 in the three-dimensional space during a step 170 that replaces steps 120 and 13, by using for example a SLAM (Simultaneous Localization And Mapping) method.

These movements are for example acquired by a three-axis accelerometer 260 comprised in the telephone 200 during a step 175 carried out prior to step 170.

Thus, as the calculation time is faster, the display of the data associated with the players is more stable in relation to the instantaneous position of the mobile elements 230.

Also for the purpose of improving the position of the data overlay 240, in particular so as to give the impression that the mobile element 235 is monitored by the method 100, the method 100 can include an optional step 180 comprised before the step 160 in order to correct the instantaneous position of the mobile element 230 in the reference frame of the space according to an instantaneous speed and/or an instantaneous acceleration of the mobile element 230. This instantaneous speed and this instantaneous acceleration, provided for example with the data associated with the mobile elements or calculated from successive instantaneous positions, make it possible to predict the position of the mobile element 230 in a short interval of time.

This step 180 makes it possible in particular to overcome the latencies that can occur in the transmission of the data to the telephone 200.

In order to improve the realism of the display, in particular when at least one graphic element such as a line, a circle, a triangle is displayed, the method can comprise a step 190 during which an occlusion is calculated from a clipping of a mobile element, such as a player. This occlusion makes it possible to suppress a portion of the graphic element overlayed on the screen or to prevent the overlay of this portion of the graphic element from being superimposed on the mobile element. The step of occlusion 190 can be carried out before or after the overlay step 160.

Knowing the position of a mobile element at a given instant in the image, the clipping can be carried out via a detecting of a contour of this element or by any other techniques known to a person skilled in the art. Another clipping technique consists of a pose estimation of a model that represents a mobile element, such as a player. Thus, knowing the usual size of a player, an estimation of the overall posture of the player can be carried out by analyzing the visible portion of this player on an image or in a sequence of images, by detecting in particular characteristic points of the structure of the player, generally articulation points of the skeleton of the player. By estimating the overall posture of the player, it is then possible to define an estimation of the total volume occupied by the player as well as their position in the space.

From the position of the field and of the mobile elements in the image, it is possible to select, during an optional step 195 a mobile element in particular by clicking, or by touching, a zone of the screen, referred to as interaction zone, in the vicinity of the image of the mobile element. From the coordinates of the interaction zone of the screen, it is possible to display in an overlay the statistics of the player who is the closest to the coordinates of the interaction zone.

The invention claimed is:

1. An augmented reality method for monitoring an event in a space comprising an event field in real time processed by a portable device comprising a screen and a camera, comprising:

acquiring, by the camera, a plurality of images of the space, the space comprising at least two landmarks, the portable device being associated with a two-dimensional reference frame, referred to as a reference frame of the image;

detecting said at least two landmarks of the space in at least one of said plurality of images acquired by the camera, the space being associated with a three-dimensional reference frame, referred to as a reference frame of the space;

determining a three-dimensional position and orientation of the space in relation to the camera with reference to said at least two landmarks;

transmitting data representing at least one of said plurality of images to a remote server without transmitting the video stream;

receiving, from the remote server, an initial three-dimensional position and orientation of the space in relation to the camera, said initial position and orientation being determined by the remote server based on said at least two landmarks detected in said at least one image;

acquiring, by the portable device, an instantaneous movement of the portable device in rotation and in translation;

updating, by the portable device, the three-dimensional position and orientation of the space in relation to the camera from the initial three-dimensional position and orientation received from the remote server based on the instantaneous movement of the portable device;

receiving an instantaneous position, within the reference frame of the space, of a mobile element moving in the space, the instantaneous position being determined outside the portable device;

calculating a position of the mobile element in the reference frame of the image from transformation parameters between the reference frame of the space and the reference frame of the image, the transformation parameters being calculated from the updated three-dimensional position and orientation of the space in relation to the camera; and displaying on the screen at least one overlay at a predetermined distance in relation to the position of the mobile element in the reference frame of the image.

2. The augmented reality method of claim 1, comprising before the monitoring of the event:

acquiring a plurality of partial images of event fields with an image acquisition device and recording the images of the event fields along with a three-dimensional position and an orientation of the image acquisition device; and using a deep learning method on the partial images of the event fields previously recorded, for recognizing a type of a field, landmarks associated with the type of the field, the reference frame of the space and a reference frame of the image acquisition device.

3. The augmented reality method of claim 1, wherein a landmark is chosen from:

a line of a marking comprised in the space;

a semi-circle of a marking comprised in the space;

an intersection between two lines of a marking comprised in the space;

an element standing substantially perpendicularly in relation to a surface comprised in the space;

an element characteristic of a structure comprised in the space;

a logo comprised in the space; and a marker comprised in the space.

4. The augmented reality method of claim 1, further comprising an automatic recognition of a type of a field comprised in the space.

5. The augmented reality method of claim 4, wherein the automatic recognition of the type of the field is carried out via a method of deep learning trained on a plurality of field images.

6. The augmented reality method of claim 1, wherein the determining the three-dimensional position and orientation of the space comprises generating parameters of a computer machine learning algorithm from a plurality of images recorded in a database, each recorded image representing all or a portion of a space of which the position and the orientation in relation to an image acquisition device having acquired said each recorded image are known.

7. The augmented reality method of claim 6, wherein the determining the three-dimensional position and orientation of the space further comprises superimposing a model of the space on at least one of the images acquired by the camera.

8. The augmented reality method of claim 1, further comprising correcting the instantaneous position of the mobile element according to an instantaneous speed of the mobile element and of an instantaneous acceleration of the mobile element.

9. The augmented reality method of claim 1, wherein the displaying on the screen said at least one overlay is performed in real time.

10. The augmented reality method of claim 1, wherein said at least one overlay comprises at least one piece of data chosen from:

a name of a player;

a statistic associated with the player selected from: a number of goals, a number of tries, a number of baskets, a number of points scored, or a number of successful passes;

a name of a team;

a positioning of a group of players in relation to other players;

a formation of the team or of a group of players;

a distance between a point on the field and the player;

a difference between two points on the field;

a graphic element selected from: a line, a circle, a square and a triangle;

a heat map;

a fixed or animated image; and a video.

11. The augmented reality method of claim 1, further comprising determining a clipping of the mobile element, the clipping generating an occlusion for at least one overlay superimposed on the image displayed on the screen.

12. The augmented reality method of claim 1, further comprising a step of selecting a mobile element and displaying a piece of information relating to the mobile element in an overlay in a vicinity of the mobile element.

13. A portable electronic device comprising a camera, a screen, at least one among an accelerometer and a gyroscope, and a processor configured to:

acquire, by the camera, a plurality of images of a space, the space comprising at least two landmarks, the portable electronic device being associated with a two-dimensional reference frame, referred to as a reference frame of the image;

detect said at least two landmarks of the space in at least one of said plurality of images of the space acquired by the camera, the space being associated with a three-dimensional reference frame, referred to as a reference frame of the space;

determining a three-dimensional position and orientation of the space in relation to the camera and said at least two landmarks;

acquire an instantaneous movement of the portable electronic device, in rotation and in translation in relation to the space using said at least one among an accelerometer and a gyroscope;

update the three-dimensional position and the orientation of the space in relation to the camera from a preceding position and orientation of the space in relation to the camera and of the instantaneous movement of the portable electronic device;

receiving an instantaneous position, within the reference frame of the space, of a mobile element moving in the space, the instantaneous position being determined outside the portable electronic device;

calculating a position of the mobile element in the reference frame of the image from transformation parameters between the reference frame of the space and the reference frame of the image, the transformation parameters being calculated from the updated three-dimensional position and an orientation of the space in relation to the portable electronic device; and displaying on the screen at least one overlay at a predetermined distance in relation to the position of the mobile element in the reference frame of the image.

14. The portable electronic device of claim 13 selected among a smartphone, augmented reality glasses and an augmented reality headset.

15. An augmented reality method for monitoring an event in a space comprising an event field in real time processed by a portable device comprising a screen and a camera, comprising:

acquiring, by the camera, a plurality of images of the space, the space comprising at least two landmarks, the portable device being associated with a two-dimensional reference frame, referred to as a reference frame of the image;

detecting said at least two landmarks of the space in at least one of said plurality of images acquired by the camera, the space being associated with a three-dimensional reference frame, referred to as a reference frame of the space;

determining a three-dimensional position and orientation of the space in relation to the camera with reference to said at least two landmarks;

receiving an instantaneous position from a data provider, within the reference frame of the space, of a mobile element moving in the space, the instantaneous position being determined outside the portable device;

calculating a position of the mobile element in the reference frame of the image from transformation parameters between the reference frame of the space and the reference frame of the image, the transformation parameters being calculated from the three-dimensional position and orientation of the space in relation to the camera; and displaying on the screen at least one overlay at a predetermined distance in relation to the position of the mobile element in the reference frame of the image;

detecting a user input on the screen of the portable device selecting a specific mobile element;

calculating, by the portable device, which mobile element corresponds to the user input based on the calculated position in the reference frame of the image; and displaying additional information associated with the selected mobile element.

* * * * *